(12) United States Patent
Weller

(10) Patent No.: US 7,398,325 B2
(45) Date of Patent: Jul. 8, 2008

(54) HEADER COMPRESSION IN MESSAGES

(75) Inventor: Scott W. Weller, Penfield, NY (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/656,946

(22) Filed: Sep. 4, 2003

(65) Prior Publication Data

US 2005/0055464 A1 Mar. 10, 2005

(51) Int. Cl.
*G06F 15/16* (2006.01)
(52) U.S. Cl. .................. 709/247; 709/232; 709/236
(58) Field of Classification Search ......... 709/246–247, 709/230, 232, 233, 236; 370/471–477
See application file for complete search history.

(56) References Cited

U.S. PATENT DOCUMENTS

| 5,177,480 | A | * | 1/1993 | Clark | 341/51 |
| 5,426,779 | A | * | 6/1995 | Chambers, IV | 707/6 |
| 5,696,926 | A | * | 12/1997 | Culbert et al. | 711/203 |
| 5,835,724 | A | | 11/1998 | Smith | 395/200.57 |
| 6,032,197 | A | * | 2/2000 | Birdwell et al. | 709/247 |
| 6,269,402 | B1 | | 7/2001 | Lin et al. | 709/227 |
| 6,397,259 | B1 | | 5/2002 | Lincke et al. | 709/236 |
| 6,973,132 | B2 | * | 12/2005 | Sato et al. | 375/240.26 |
| 7,010,727 | B1 | * | 3/2006 | Stucker | 709/247 |
| 7,197,622 | B2 | * | 3/2007 | Torkelsson et al. | 711/216 |
| 2002/0038385 | A1 | | 3/2002 | Kalliokulju | 709/247 |
| 2002/0129167 | A1 | | 9/2002 | Kanai et al. | 709/247 |
| 2002/0129168 | A1 | | 9/2002 | Kanai et al. | 709/247 |
| 2003/0013431 | A1 | | 1/2003 | O'Hare et al. | 455/412 |

\* cited by examiner

*Primary Examiner*—Glenton B. Burgess
*Assistant Examiner*—Brendan Y Higa
(74) *Attorney, Agent, or Firm*—Duke W. Yee; Arthur J. Samadovitz; Wayne P. Bailey

(57) ABSTRACT

Compression of message headers. A message including an uncompressed header, a message including a compressed header or a request to support header compression is received. In response, a determination of the impact of header compression on performance is determined. If the determination is favorable, then header compression is supported for subsequent communications. However, if the determination is not favorable, then header compression is not supported for subsequent communications. If the impact of header compression on performance is determined to be favorable, then an identifier for a reference header is returned. The identifier is for use in a subsequent compressed header. The subsequent compressed header comprises the identifier and changes relative to the reference header. A server receives a message including a compressed header. The server determines whether it has sufficient memory or storage to support header compression. If so, the server handles the message, but if not, the server refuses to handle the message or notifies a sender of the message that it will not support header compression for subsequent messages.

3 Claims, 3 Drawing Sheets

HEADER COMPRESSION IN MESSAGES

BACKGROUND OF THE INVENTION

The invention relates generally to digital communication, and deals more particularly with a technique for header compression within a digital communication.

Digital communication is well known today between clients and servers where the client can be a desktop or laptop computer, personal digital assistant ("PDA"), cell phone, device instrumentation, and sophisticated equipment. There are several well known communication protocols such as Simple Object Access Protocol ("SOAP"), TCP/IP, HTTP, and SMTP. Typically, the communication comprises a payload and a header. The header may include routing instructions (such as a destination address), name of an originating client, service or document, date, security instructions, security credentials, encryption methodology, etc. The payload can be a database object of an object oriented database, other file data, a request to read or write data, a request for a web page, executable commands, etc. The header and payload are contained by and constitute an "envelope". The length of each message affects the bandwidth/transmission time required for the transmission.

For certain types of communications, such as transfers of large documents from a desk top or lap top personal computer to a server computer using HTTP protocol, the header is a relatively small portion of each message, and therefore is not burdensome to transmit. However, in other types of communications, such as from a PDA, cell phone, device instrumentation to a server using SOAP, the header consumes a relatively large portion of each message and therefore, is burdensome to transmit. Multiple messages from a client to a server may include a similar header for each message, particularly if the messages occur during the same session or are otherwise related. For example, if the messages are all part of same unit of work, they will all likely have the same encryption key, routing, originating device, date, etc. As another example, different messages from a PDA or cell phone to a server occurring during the same session are considered related and may include a similar header. As another example, the transfer of a large file using SOAP may be accomplished using multiple, related messages with similar headers. The headers may differ only in a sequence number for the message, time stamp and document originator. There are known techniques to compress a message header.

Published US Patent Applications 2002/0129167 A1 and 2002/0129168 A1 disclose a header compression technique. Headers are named, and cached at both the client and server. When a message is sent with a new header, its name/ID is sent instead of the full header along with a list of differences from the named header. The differences are based on a byte-by-byte comparison of the new header versus the named header. With the reference header name and list of differences, the server can reconstruct the full header.

Published US Patent Application 2003/0013431 A1 discloses another header compression technique. A header is sent from a client to a server, and cached at both the client and the server. Subsequently, the client prepares another message with a header where the fields that differ from the previously sent header are left blank; the changed fields are included in the header. Upon receipt at the server, the server fills in the blank fields from the previously cached header.

While the foregoing header compression techniques are viable and efficient in some situations, they may not be viable and efficient in others.

Accordingly, an object of the present invention is to provide a header compression and analysis technique which considers the viability and efficiency of header compression.

SUMMARY OF THE INVENTION

The invention resides in a method, system and program product for compressing message headers. A message including an uncompressed header, a message including a compressed header or a request to support header compression is received. In response, a determination of the impact of header compression on performance is determined. If the determination is favorable, then header compression is supported for subsequent communications. However, if the determination is not favorable, then header compression is not supported for subsequent communications.

According to one feature of the present invention, if the impact of header compression on performance is determined to be favorable, then an identifier for a reference header is returned. The identifier is for use in a subsequent compressed header. The subsequent compressed header comprises the identifier and changes relative to the reference header.

According to another feature of the present invention, a server receives a message including a compressed header. The server determines whether it has sufficient memory or storage to support header compression. If so, the server handles the message, but if not, the server refuses to handle the message or notifies a sender of the message that it will not support header compression for subsequent messages.

According to another feature of the present invention, the compressed header comprises an identifier to a reference, uncompressed header and changes relative to the reference header. If the server has sufficient memory or storage to support header compression, then the server forms an uncompressed header based on the compressed header, and returns to a sender of the message an identifier of the uncompressed header to be used for a subsequent compressed header.

DETAILED DESCRIPTION OF THE PREFERRED EMBODIMENTS

Figure 1:
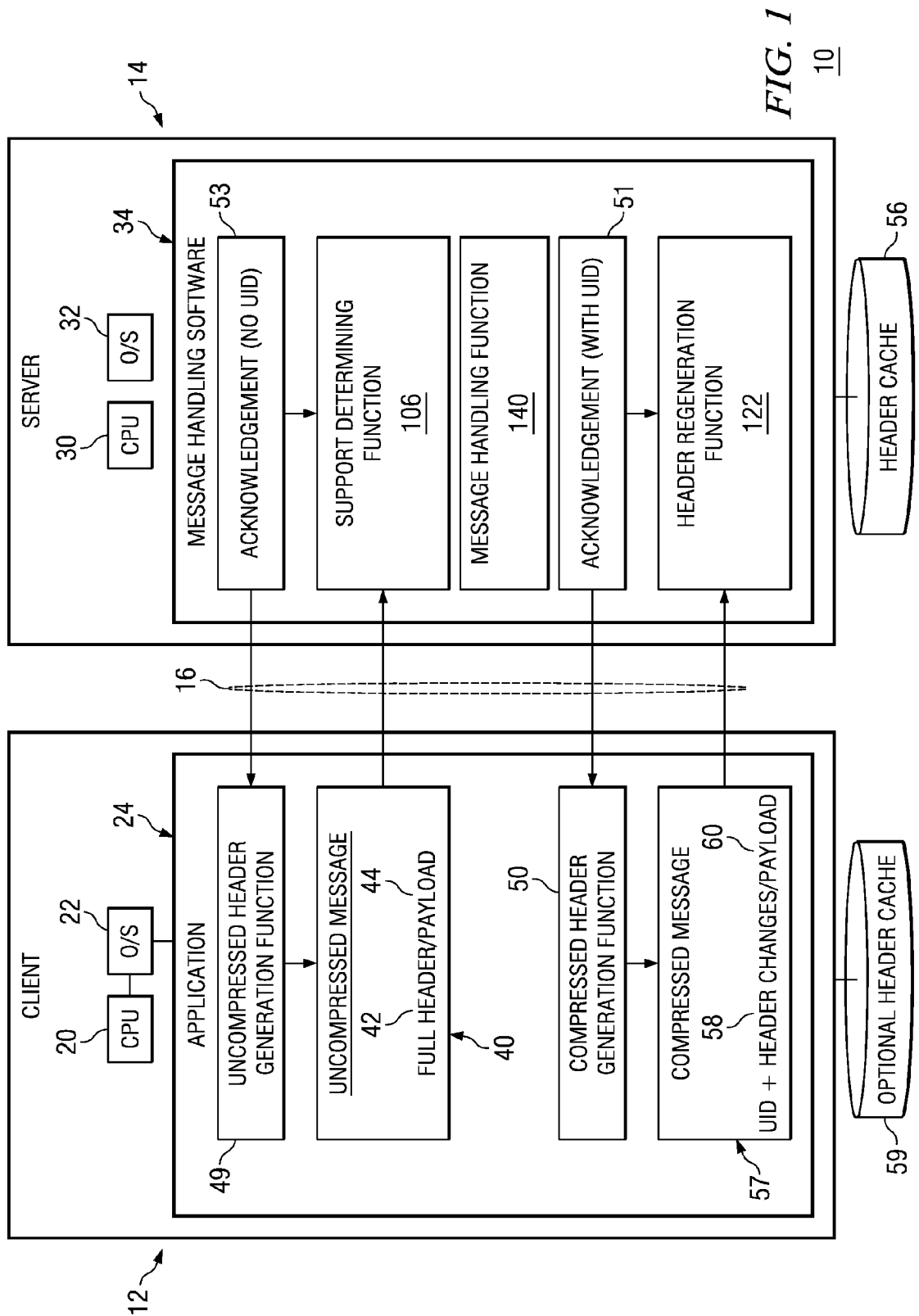
FIG. 1 is a block diagram of a client and server which embody the present invention.

Referring now to the drawings in detail, wherein like reference numerals indicate like elements throughout, FIG. 1 illustrates a computer system generally designated 10 according to the present invention. System 10 comprises a client 12, a server computer 14 and an intervening, known communication system 16. Client 12 can be a desktop or lap top personal computer, PDA, cell phone, electronic instrument/tool, equipment, etc. In the illustrated embodiment, client 12 includes a CPU 20, an operating system 22 executing on the CPU 20, and an application 24 executing on the operating system and CPU. Application 24 can be a browser, e-mail agent or connectivity application. Server 14 comprises one or more CPUs 30, an operating system 32 executing on CPU 30, and server software 34 executing on operating system 32 and CPU 30. Server software 34 can be an e-mail service web site or connectivity software. The communication system 16 comprises components such as electrical or optical transceivers and associated electrical or optical cabling, wireless communication transceivers, and/or networking hardware. Various, known communication protocols can be used for the communication between the client 12 and the server 14 such as SOAP, TCP/IP, HTTP, HTML, FTP, or SMTP.

Occasionally, application 24 needs to send messages to server software 34. For example, application 24 may need to send objects of an object-oriented data base to server 14. (Other examples of payloads are file data, a request to read or write data, a request for a web page, etc.) The application 24 may format the objects of the data base into XML and package each object using SOAP. Server 14 can be the final destination of the objects or an intermediary server in a path to the final destination. As explained in more detail below with reference to FIG. 2, an initial message will include either a full/uncompressed header 42 and a payload 44 (collectively called "uncompressed" message 40) or a compressed header 58 and a payload 60 (collectively called "compressed" message 57). The full header comprises one or more of the following: routing information, encryption information, originator information, date stamp or creator information. The following is an example of a known envelop with a full header for a sample request made by client 12 to server 14, where each line indicated below is a sequential field in the envelope:

Example Envelope

| Request: |
|---|
| 1. <soapenv:Envelope xmlns:soapenv="http://schemas.xmlsoap.org/soap/envelope/" xmlns:xsd="http://www.w3.org/2001/XMLSchema" xmlns:xsi="http://www.w3.org/2001/XMLSchema-instance" xmlns:SOAP-ENC="http://schemas.xmlsoap.org/soap/encoding/"> |
| 2. <soapenv:Header> |
| 3. <wsse:Security soapenv:actor="http://www.jStartcustomer.com/actors#verifier" soapenv:mustUnderstand="1" xmlns:wsse="http://schemas.xmlsoap.org/ws/2002/04/secext"> <Signature xmlns="http://www.w3.org/2000/09/xmldsig#"> |
| 4. <SignedInfo> |
| 5. <CanonicalizationMethod Algorithm="http://www.w3.org/2001/10/xml-exc-c14n#"/> |
| 6. <SignatureMethod Algorithm="http://www.w3.org/2000/09/xmldsig#rsa-sha1"/> |
| 7. <Reference URI="#sign_content_1043176028580"> |
| 8. <Transforms> |
| 9. <Transform Algorithm="http://www.w3.org/2001/10/xml-exc-c14n#"/> |
| 10. </Transforms> |
| 11. <DigestMethod Algorithm="http://www.w3.org/2000/09/xmldsig#sha1"/> |
| 12. <DigestValue>FLuQTa/LqDIZ5F2JSaMRHSRuaiQ=</DigestValue> |
| 13. </Reference> |
| 14. </SignedInfo> |
| 15. <SignatureValue> |
| 16. kGlrrXjKku/WXKxID+JJkEXY+aGNYHc5dy8GwbLFtB5Msll2/MhwdnO9wastJ0gLPzLy3oHL |
| 17. 7A8ggkMkjgAqnLg6PTzM7MdKoIAhe+xRHdOysamGucFJQRMrU+JQ4WATJt0bpdClwJy6mexT |
| 18. Su48mq1q5rM9YZh61P7UEUKt+EQ= |
| 19. <Signature Value> |
| 20. <KeyInfo xmlns="http://www.w3.org/2000/09/xmldsig#"> |
| 21. <Key Value> |
| 22. <RSAKeyValue> |
| 23. <Modulus> |
| 24. 2sW+eBjx5D2QMyr8ocZIZWNYHGf9zYhB4XWILPCTvhNV7dIe318ARepOA1ABFK2OMy |
| 25. pzb+Rb+nWQeo//yFz/28PmL63kdLiE72qmmQuzuPa5NXaV9pJ4JKw86QdLhGGpFIRH |
| 26. 18Iugf3xLFwQEZqKYnblTUs7ftnTgW5r4HH492k= |
| 27. </Modulus> |
| 28. <Exponent>AQAB</Exponent> |
| 29. </RSAKeyValue> |
| 30. </KeyValue> |
| 31. <X509Data> |
| 32. <X509IssuerSerial> |
| 33. <X509IssuerName>OU=Java,O=IBM,L=Unknown,ST=Oklahoma,C=US</X509IssuerName> |
| 34. <X509SerialNumber>0</X509SerialNumber></X509IssuerSerial> |
| 35. <X509SubjectName>CN=John Doe</X509SubjectName> |
| 36. <X509Certificate> |
| 37. MIIB0TCCAToCAQAwDQYJKoZIhvcNAQEEBQAwTzELMAkGA1UEBhMCVVMxETAPBgNVBAgTCE9rbGFo |
| 38. b21hMRAwDgYDVQQHEwdVbmsam3duMQwwCgYDVQQKEwNJQk0xDTALBgNVBAsTBEphdmEwHhcNMDIw |
| 39. OTI1MTAxMTQ4WhcNMDMwOTI1MTAxMTQ4WjATMREwDwYDVQQDEwhKb2huIERvZTCBnzANBgkqhkiG |
| 40. 9w0BAQEFAAOBjQAwgYkCgYEA2sW+eBjx5D2QMyr8ocZIZWNYHGf9zYhB4XWILPCTvhNV7dIe318A |
| 41. RepOA1ABFK2OMypzb+Rb+nWQeo//yFz/28PmL63kdLiE72qmmQuzuPa5NXaV9pJ4JKw86QdLhGGp |
| 42. FIRH18Iugf3xLFwQEZqKYnblTUs7ftnTgW5r4HH492kCAwEAATANBgkqhkiG9w0BAQQFAAOBgQCs |
| 43. OD02WMoYcMR7Sqdb9oQyk7Nn4rQ5DBgZ5mxGGVzWxBZW/QON+Ir2j4KUjX1jalMvbHa9lnhPQmJi |

-continued

Request:

44. Ued923rza7fvdRG2CDalbW0R3aPd5q0u3akP0/Ejb7z5o88heajCSgfRruvU+ZdOTT3Oe+RBQg w8
45. VuzbLApPnXiehowYuA==
46. </X509Certificate>
47. </X509Data>
48. </KeyInfo>
49. </Signature>
50. </wsse:Security>
51. </soapenv:Header>
52. <soapenv:Body>
53. application specific data/content
54. </soapenv:Body>
55. </soapenv:Envelope>

Rewrite example, rewriting the <Exponent>, a sub element inside <KeyInfo>, shown above on line #28

```
<Envelope>
    <Header>
        <use-header "123" />
        <KeyInfo>
            <KeyValue>
                <RSAKeyValue>
                    <Exponent>KZRT</Exponent>
                </RSAKeyValue>
            </KeyValue>
        </KeyInfo>
    </Header>
    <Payload>
        ...
    </Payload>
</Envelope>
```

In the foregoing example, line one is an XML tag for the beginning of the envelop, and includes a statement of the "name scope", i.e. the domain for the envelop name. Lines two through fifty one are the envelop header. Line two is the XML tag for beginning of the envelop header and line fifty one is the XML tag for the ending of the envelop header. Lines three through fifty are the contents of the header including hierarchical lower level XML tags and respective header data. The hierarchical lower level XML tags, in this example, are "KeyInfo", "KeyValue", "Exponent", and "RSAKeyValue". Also in the foregoing example, line fifty three is the actual payload or "body" of the message indicated generally as "application specific data/content". This payload is surrounded by XML tags "Soapenv:Body" in lines fifty two and fifty four. In this example, there is only one line of actual payload, although there can be many lines of payload in other examples. Line fifty five is the XML tag for the end of the envelop.

As explained in more detail below, after receipt of the foregoing envelop with the full header, the server 14 may decide to cache the header and respond with an acknowledgment 51 including a universal identifier ("UID") for subsequent use by the client instead of the full header. The foregoing response by the server with the UID can be as follows:

Response: Server indicates it has cached this header, and labeled it "123"

56. <Ack>
57.    <receive-status "OK" />

-continued

Response: Server indicates it has cached this header, and labeled it "123"

58.    <uid-header "123" />
59. </Ack>

(Alternately, server 14 can respond with a prior art acknowledgment 53 that does not include a UID, and cannot be the basis for a subsequent compressed message from client 12.) In the foregoing example, the server responded with a UID "123". In such a case where the server responds with the UID, the client will subsequently use the compressed header 58 with a UID of a full header cached at the server (in header cache 56) and optionally cached at the client (in optional client cache 59). The compressed header 58 also includes a specification of changes, if any, for the header of the current message relative to the referenced, full header cached at the server. An example of such a compressed message, corresponding to the uncompressed message above and using the UID returned in the foregoing response by the server is as follows:

Rewrite example, rewriting the <Exponent>, a sub element inside <KeyInfo>, shown above on line #28

```
<Envelope>
    <Header>
        <use-header "123" />
        <KeyInfo>
            <KeyValue>
                <RSAKeyValue>
                    <Exponent>KZRT</Exponent>
                </RSAKeyValue>
            </KeyValue>
        </KeyInfo>
    </Header>
    <Payload>
        ...
    </Payload>
</Envelope>
```

Thus, the full envelop is replaced with the compressed envelop containing the following XML tags and data—"Envelop" tag, "Header" tag, "use-header "123" header data, "KeyValue" tag, "RSAKeyValue" tag, "Exponent" tag, "KZRT" exponent (header) data, and "Body" tag and new payload data. As evidenced by a comparison of the full envelop/message to the compressed envelop/message, there is considerable savings in header length.

As explained in more detail below with reference to FIG. 2, server software 34 is able to parse and handle both the uncompressed message 40 and the compressed message 57. In accordance with the present invention, server software 34 decides whether it will support compression of the header from client 12 (and other clients, not shown). This decision is based on various factors, as described below.

Figure 2:
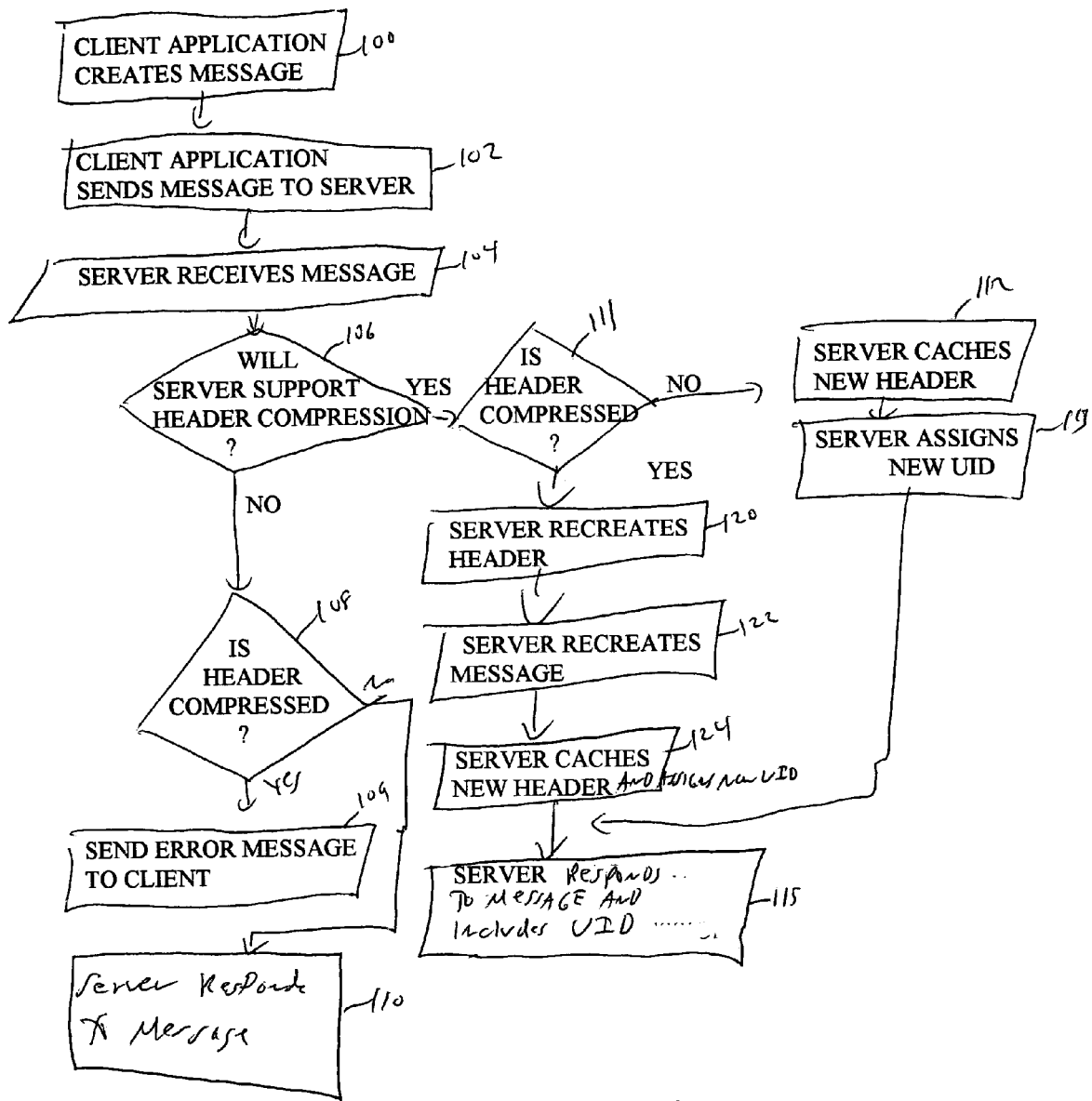
FIG. 2 is a flow chart illustrating a header compression and analysis process within the client and server of FIG. 1, according to the present invention.

As illustrated in FIG. 2, application 24 creates a message, either with a full header or a compressed header (step 100). In the case of the compressed header, application 24 determines the header changes to accompany the UID either by (a) comparison of the currently needed header to the reference header cached at client 12 or (b) if there is no such caching of the reference header at client 12, by knowledge of the previously used, reference header. Next, application 24 sends the message (with the compressed or uncompressed header) via operating system 22 and communication system 16 to server 14 (step 102). The communication of the message from the client to the server conforms to the desired communication protocol. Next, the server 14 receives the message and parses and reads the header to determine if server 14 is the intended recipient. If not, server 14 either ignores the message or forwards it to the intended recipient. If server 14 is the intended recipient, server 14 passes the message to the program within server 14 that should handle the message. In the illustrated example, this is server software 34 (step 104). Then, server software 34 determines if it will support header compression for messages of this type from client 12 (decision 106). This determination is based on the following factors:

a) performance—(i) if the payload is many times larger than the header, then it is not necessary to cache the header; the savings would be minimal, or (ii) if this client does not often send messages to the server, then there would be little savings in caching the header for subsequent communications from this client, or (iii) if a header of this type typically changes substantially from message to message, then there would be little or no savings in caching the headers because the client would have to send many header changes with each message. Server software 24 may consider one or more of the foregoing performance factors in determining whether to support header compression for this type of message or from this client.

b) if the server has sufficient storage available at the time to cache the header(s). If the server does not have adequate storage, then it will not support header compression. Also, in some cases, the header is too large to practically cache.

c) whether the service level agreement between the owner of the server and the owner of the client requires caching of headers at the server. Header caching and reconstruction requires extra processing/effort at the server because the server has to re-create each header which is not supplied in full in the message. In some cases, the server may not offer this service unless it is specified in the service level agreement outside the scope of the client-server communications.

d) whether security requirements such as a need to encrypt the entire header will prevent sending anything but the full header (because the server will not be able to discern the changes).

If the server software 34 is not willing or able to support header compression (decision 106, no branch), then server software 34 determines if the header is compressed, i.e. includes a UID instead of a full header (decision 108). If so, server software 34 will not handle the message and instead sends an error message back to the client indicating that the message should be resent with a full header (step 109). If not, server software 24 will handle the message (with message handling function 140) and respond to the message in the prior art manner, and not include any UID (step 110).

Referring again to decision 106, if server software 34 is willing to support header compression for this type of message or all messages from client 12 (yes branch), then the server software 34 checks if the current message from client 12 includes a full header or a compressed header, i.e. a UID for a header previously cached at server 14 and changes, if any, to the cached header (decision 111). If the current header is full/uncompressed, then server software 34 will cache the current header (step 112) and assign a new UID to the current header (step 113). (Alternately, server software 34 may compare the current header to those previously cached from this client, and if the current header is the same as one of the previously cached headers, then not cache the current header and instead use the previously established UID for the current header. If the current header is similar but not the same as a previously cached header, then server software 34 may alternately cache (in cache 56) the changes relative to the previously cached header, assign a new UID for the changes and include with the changes a pointer to the previously cached, reference header.) Then, server software 34 handles the message (with message handling function 140) and responds to the message in the prior art manner, except that the server software 34 will include the UID in the response (step 115).

Referring again to decision 111, if the current message includes a compressed header, i.e. a UID and changes, if any, to the previously cached header referenced by the ULD, then server software 34 recreates the full header (step 120). The server software 34 recreates the full header by reading from cache 56 the previously cached header referenced by the ULD in the current compressed message header, and then modifying the previously cached header with the changes, if any, in the current message header of the compressed message. Next, the server software combines the recreated, full header with the current payload to form a full, current message (step 122). Then, server software assigns a new UID for the recreated, full current header and caches the recreated, full current header (step 124). Then, server software 34 handles and responds to the recreated, full current message in the prior art manner, except that the server software 34 will include the ULD in the response (step 115). The UID represents the recreated, full current header (if a compressed header was furnished by the client in step 100) or the UID for the full current header (if the full header was furnished by the client in step 100). The server software 34 also returns an acknowledgment that the message was handled. For subsequent messages, the client 12 can opt to use this UID (or other UID previously or subsequently retuned by server 14) to compress the respective message from the client. Compression of the messages will reduce the bandwith/transmission time requirement for the messages sent from the client to the server. As noted above, if the server software 34 is not willing to support header compression for this type or any type of message from client 12, then the server software 34 does not return a UID in step 110, and instead returns a simple acknowledgment that the message was handled.

Figure 3:
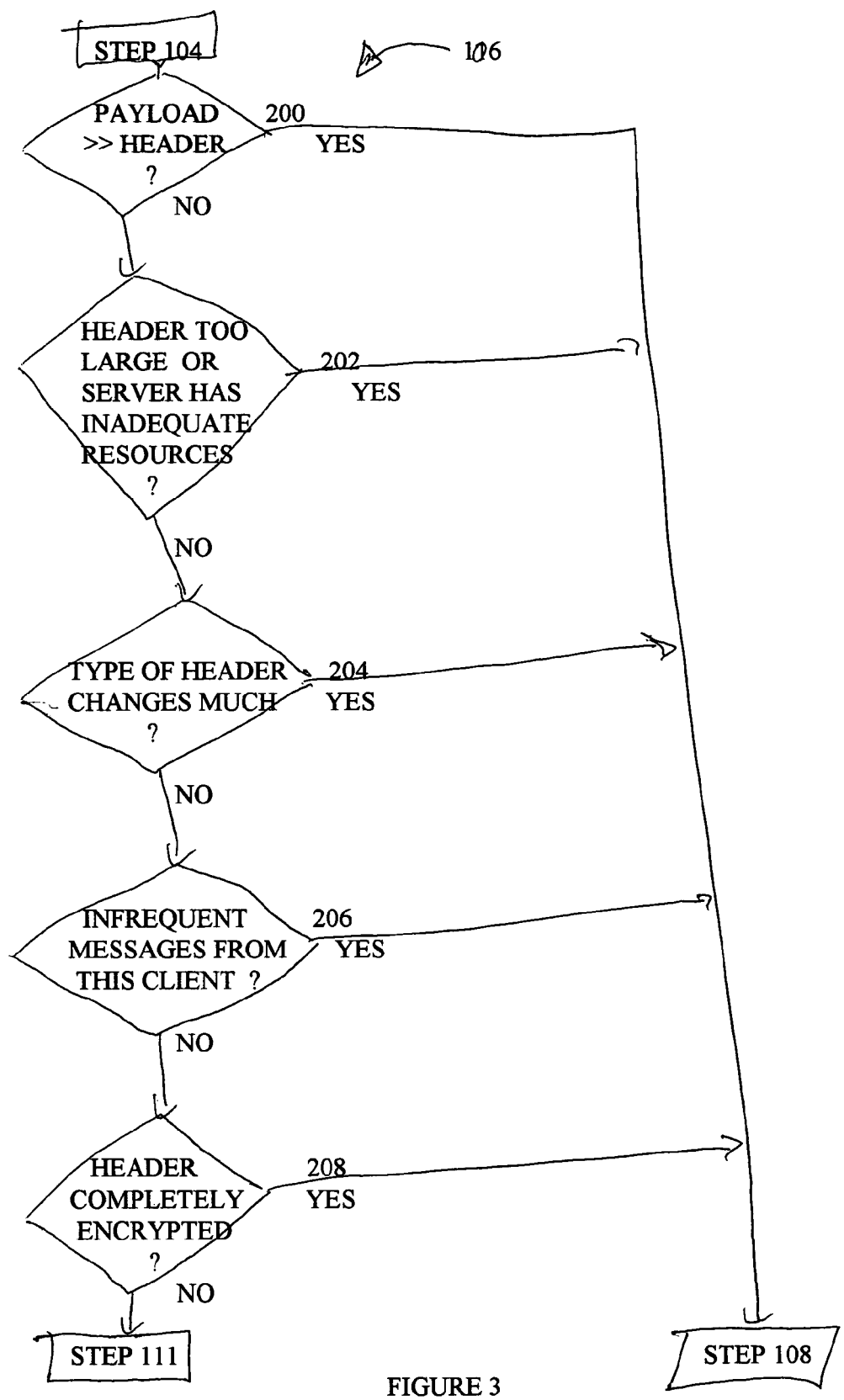
FIG. 3 is a flow chart illustrating a program function within the server of FIG. 1 for determining whether the server will support header compression.

FIG. 3 illustrates in more detail decision 106. Decision 106 is the function within server software 34 which determines whether server software 34 will support header compression for subsequent messages. In step 200, server software 34 parses the uncompressed message, and compares the length of the uncompressed header to the length of the payload. If the payload is much larger, for example, five times larger, then server software 34 decides not to support header compression. The reason is that the percent reduction in message traffic would be small; in this example, less than twenty percent, and there would be the overhead of caching the header, and reconstructing the full message for subsequent messages. Referring again to decision 200, if the payload is not much larger than the header (decision 200, no branch), then server software 34 determines if server 14 has sufficient resources, mainly storage and processes, to support caching (decision 202). This determination is made by checking the computing environment resource manager for the amount of available storage and processes, and then comparing this amount to a predetermined threshold. If server 14 does not have sufficient resources, then server software 34 decides not to support header caching. However, if server 14 has sufficient available resources (decision 202, no branch), then server software 34 determines if the header is a type that typically changes so much from message to message that little would be saved by header compression; (i.e., the changes to send with each uncompressed message if header caching was supported is likely to be similar in size to the new header itself). An example of this type of header is a simple routing header. These types of headers are listed in a file, and server software 34 checks the file for the type of header in the current uncompressed message to make decision 204. If the header is a type that is not expected to change much from message to message (decision 204, no branch), then server software 34 determines the last time that client 12 sent a message to server 14 (decision 206). If the elapsed time is greater than a threshold, then it is assumed that this client infrequently sends messages to server 14. Therefore, little message traffic would likely be saved by server caching, and server software 34 decides not to support header caching. However, if the elapsed time is less than the threshold (decision 206, no branch), then server software 34 determines if the header of the current message is completely encrypted (decision 208), as indicated by flags in the header content per the protocol in use. If the header of the current message is completely encrypted, then it is not feasible to support header caching. The reason is that subsequent messages will likewise require complete encryption, and encryption is performed across the entire header, and not separate fields. In the illustrated embodiment, if all the the decisions 200, 202, 204, 206 and 208 are "no", then server software 34 will support header caching and proceed to step 111 described above. If any of the decisions 200, 202, 204, 206 and 208 are yes, then server software 34 proceeds to step 108, as described above. However, it should be understood, that in other embodiments of the server software 34 contemplated by the present invention, not all of the tests of decisions 200, 202, 204, 206 and 208 will be made depending on what type of messages the server expects to receive from the client and the effort involved in making each of these decisions. For example in another embodiment of the present invention, step 106 comprises only a test for sufficient available server storage and a test of whether the header is completely encrypted. In still another embodiment of the present invention, step 106 comprises only a comparison of the payload length to the header length (when encryption is not expected).

Based on the foregoing, a technique to compress message headers has been disclosed. However, numerous modifications and substitutions can be made without deviating from the scope of the present invention. For example, the use of a tagged protocol such as SOAP is not required; any structured message can be compressed using this technique. Therefore, the present invention has been disclosed by way of illustration and not limitation, and reference should be made to the following claims to determine the scope of the present invention.

The invention claimed is:

1. A method for processing message headers by a first data processing system, said method comprising:
receiving, from a second data processing system, a message including a compressed header comprising an identifier to a referenced, uncompressed header and changes from said referenced, uncompressed header, and in response,
determining impact of header compression on performance, and
if favorable, supporting the header compression for subsequent communications, and
if unfavorable, refusing to support the header compression for the subsequent communications, wherein if the impact of header compression on performance is determined to be favorable, then handling said message by forming another uncompressed header based on said referenced, uncompressed header and said changes, and returning another identifier for said another uncompressed header to the second data processing system, said another identifier being assigned by the first data processing system for use in another compressed header generated by the second data processing system.

2. A method for compressing message headers by a first data processing system, said method comprising:
receiving, from a second data processing system, a message including a compressed header, wherein said compressed header includes an identifier to a referenced header and changes relative to said referenced header;
determining impact of header compression on performance, and
if favorable, handling said message, and
if unfavorable, refusing to handle said message,
wherein if the impact of header compression on performance is favorable, further comprising reconstructing said message with an uncompressed header based on said referenced header and said changes, before the step of handling said message, and returning another identifier for said uncompressed header to the second data processing system, said another identifier being assigned by the first data processing system for use in another compressed header generated by the second data processing system.

3. A method for compressing message headers by a first data processing system, said method comprising:
receiving, from a second data processing system, a message including an uncompressed header, a message including a compressed header or a request to support header compression, and in response,
determining if there is sufficient storage available to support the header compression, and
if so, supporting the header compression for subsequent communications, and
if not, refusing to support the header compression for the subsequent communications,
wherein said compressed header includes an identifier to a referenced, uncompressed header and changes relative to said referenced, uncompressed header, and the receiving step comprises receiving the message including a compressed header, and if there is the sufficient storage available to support the header compression, then generating another uncompressed header based on said referenced, uncompressed header and said changes and returning another identifier for said generated another uncompressed header to the second data processing system to be used for a subsequent compressed header, said another identifier being assigned by the first data processing system.

* * * * *